US006974194B2

(12) United States Patent
Schreiber et al.

(10) Patent No.: US 6,974,194 B2
(45) Date of Patent: Dec. 13, 2005

(54) WHEEL MOUNT ASSEMBLY

(75) Inventors: Philip Schreiber, Denver, CO (US); Steven L. Lindquist, Westminster, CO (US); Brandon McKee, Boulder, CO (US); Allen B. Killebrew, Longmont, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 132 days.

(21) Appl. No.: 10/455,522

(22) Filed: Jun. 5, 2003

(65) Prior Publication Data

US 2003/0227151 A1 Dec. 11, 2003

Related U.S. Application Data

(60) Provisional application No. 60/386,361, filed on Jun. 6, 2002.

(51) Int. Cl.[7] .............................................. B60B 35/00
(52) U.S. Cl. ........................... 301/111.06; 301/111.07; 301/121; 280/250.1; 280/304.1; 403/374.1
(58) Field of Search ...................... 301/111.01, 111.03, 301/111.04, 111.06, 111.07, 115, 122, 121; 280/250.1, 304.1; 403/370, 374, 374.1, 374.2

(56) References Cited

U.S. PATENT DOCUMENTS

| | | | | |
|---|---|---|---|---|
| 5,060,962 | A * | 10/1991 | McWethy | 280/304.1 |
| 5,145,277 | A * | 9/1992 | Fujita et al. | 403/374.4 |
| 5,174,680 | A * | 12/1992 | Nakamura et al. | 403/370 |
| 5,851,018 | A * | 12/1998 | Curran et al. | 280/250.1 |
| 6,247,717 | B1 * | 6/2001 | Lovins et al. | 280/250.1 |
| 2001/0001521 | A1 * | 5/2001 | Melgarejo et al. | 280/250.1 |

* cited by examiner

*Primary Examiner*—Russell D. Stormer
(74) *Attorney, Agent, or Firm*—MacMillan, Sobanski & Todd, LLC

(57) ABSTRACT

A wheel mount assembly adapted for use in securing a camber tube to a wheelchair frame comprises an axle plate, at least one axially displaceable member adapted to be fixed in relation to the axle plate, and at least one radially displaceable member adjacent the axially displaceable members. The axially displaceable member is adapted to be axially displaced to cause the radially displaceable member to be displaced to tighten against the camber tube to hold the camber tube in place.

20 Claims, 4 Drawing Sheets

WHEEL MOUNT ASSEMBLY

CROSS REFERENCE TO RELATED APPLICATIONS

This application claims the benefit of U.S. Provisional Patent Application No. 60/386,361, filed on Jun. 6, 2002.

BACKGROUND OF INVENTION

This invention relates in general to improvements in wheel mount assemblies of the type used with wheelchairs and other devices. More particularly, this invention relates to an improved wheel mount assembly that provides wheel height adjustability, center of gravity adjustability, and camber toe-in/toe-out adjustability.

Wheel mount assemblies in general are well known in the art for use with many different types of wheeled devices. Such wheel mount assemblies are commonly employed for mounting the rear wheels on a typical wheelchair. Each wheel mount assembly typically incorporates a number of adjustments that allow the wheelchair occupant to customize the wheelchair to his or her anthropometry and driving conditions. Typical manual wheelchairs provide a height adjustment in the rear wheels and/or the front casters. Frequently, the rear wheels of the wheelchair are cambered, or angled with respect to a vertical plane. A wheelchair with a large camber angle has more responsive turning, which is typically beneficial in sports applications. A wheelchair with a little to no camber angle has a smaller overall width and thus greater maneuverability in tight confines.

When an adjustment is made to the rear wheel height or the front caster height on a wheelchair with cambered rear wheels, the rear wheels will toe in or toe out. That is to say, the rear wheels become misaligned with respect to the frame. This misalignment is undesirable because it increases rolling friction. If the rear wheels are raised or the front casters are lowered, the rear wheels will toe out. Conversely, if the rear wheels are lowered or the front casters are raised, the rear wheels will toe in. This occurs because the axes of the rear wheels are no longer aligned horizontally. To correct this, the mounting hardware that attaches the rear wheels to the wheelchair frame must allow the axles of the rear wheel to rotate in order to re-align the camber angle within a vertical plane.

Some wheelchairs, typically high performance wheelchairs, provide the ability to adjust the fore/aft position of the rear wheel with respect to the wheelchair frame. Such adjustment is known as a "center-of-gravity" adjustment. Moving the rear wheels rearward produces a more stable wheelchair that is less likely to tip backwards. Moving the rear wheels forward makes the wheelchair easier to balance on the rear wheels. This helps with maneuverability over obstacles, such as curbs, where the wheelchair occupant must lift the front casters off the ground in order to traverse the obstacles.

While many wheelchairs provide wheel height, camber, toe-in, toe-out, and center of gravity adjustability, there is a need for a lightweight, user-friendly adjustment design.

SUMMARY OF INVENTION

The present invention is directed towards a wheel mount assembly that meets all the foregoing needs. The wheel mount assembly is adapted for use in securing a camber tube to a wheelchair frame. The wheel mount assembly comprises an axle plate, at least one axially displaceable member adapted to be fixed in relation to the axle plate, and at least one radially displaceable member adjacent the axially displaceable members. The axially displaceable member is adapted to be axially displaced to cause the radially displaceable member to be displaced to tighten against the camber tube to hold the camber tube in place.

Various objects and advantages of this invention will become apparent to those skilled in the art from the following detailed description of the preferred embodiment, when read in light of the accompanying drawings.

DETAILED DESCRIPTION

Figure 1:
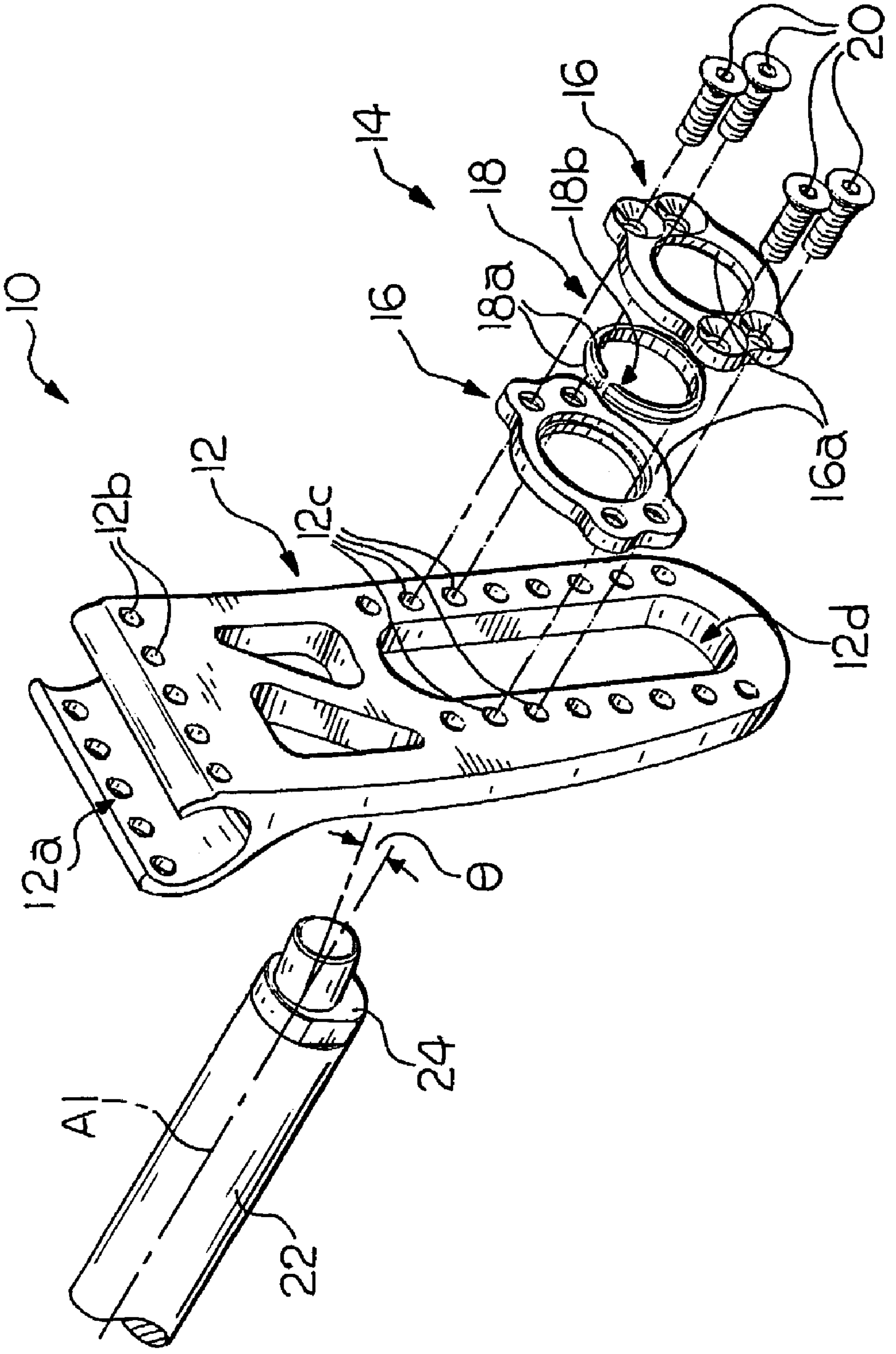
FIG. 1 is a perspective view of an improved wheel mount assembly according to a preferred embodiment of the invention.
Figure 2:
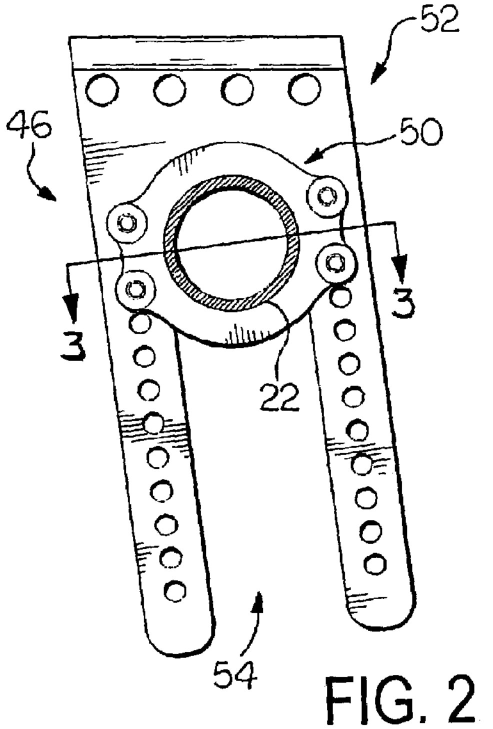
FIG. 2 is a side elevational view of an improved wheel mount assembly according to another embodiment of the invention.

Referring now to the drawings, there is illustrated in FIG. 1 an improved wheel mount assembly 10 according to a preferred embodiment of the invention. The wheel mount assembly 10 is adapted for use in mounting a rears wheel (not shown) to the frame of a wheelchair (also not shown). The wheel mount assembly 10 provides height, center of gravity, camber, toe-in, and toe-out adjustability for the rear wheel of the wheelchair. The wheel mount assembly 10 is comprised of an axle plate 12 having formed at an upper end thereof a saddle or cradle 12*a* for attaching the axle plate 12 to a tubular wheelchair frame (not shown). A series of holes 12*b* in the cradle 12*a* are adapted to align with similarly spaced holes in the wheelchair frame to allow the axle plate 12 to be mounted at various fore/aft positions on the wheelchair frame. It should be noted that the cradle 12*a* is adapted to wrap around the wheelchair frame so as to capture the wheelchair frame therein. It should be appreciated by one of ordinary skill in the art of the invention that the present invention is not intended to be limited to the cradle 12*a* described and shown and that mounts of other shapes and character, such as those shown in FIGS. 2–9, may be suitable for attaching the axle plate 12 to the wheelchair frame.

A clamp assembly 14 is adapted to be supported by the axle plate 12. The clamp assembly 14 according to the preferred embodiment of the invention comprises one or more axially displaceable members, such as a pair of spaced compression plates 16, and one or more radially expandable, deformable, or displaceable members, such as a compression sleeve 18. The compression sleeve 18 is provided between the compression plates 16. Fasteners, such as the four cap screws 20 shown, are used for clamping the clamp assembly 14 to the axle plate 12.

A wheel mount assembly, such as the wheel mount assembly 10 described above, is adapted to be attached to each side frame of the wheelchair (not shown). That is to say, one wheel mount assembly 10 is attached to the left side frame of the wheelchair and one wheel mount assembly 10 is attached to the right side frame of the wheelchair. Each wheel mount assembly 10 is adapted to support a separate camber tube. Alternatively, the wheel mount assemblies 10 can cooperatively support a single camber tube 22 in a manner such that the camber tube 22 extends between the left and right side frames. This arrangement adds rigidity to the wheelchair frame. Opposing ends of the camber tube 22 are adapted to support the left and right rear wheels (not shown) of the wheelchair. This can be accomplished in any suitable manner. For example, an axle sleeve 24 can be supported by each end of the camber tube 22. These axle sleeves 24 can be tilted at an angle θ with respect to the axis A1 of the camber tube 22. This tilt angle θ cambers the rear wheels. Toe in and toe out can be eliminated by rotating the camber tube 22 within the wheel mount assembly 10 until the tilt angle θ and camber tube axis A1 lie in a common vertical plane.

As stated above, the compression plates 16 are mounted to the axle plate 12 using fasteners. Fasteners, such as the cap screws 20 shown, are adapted to be threaded into mating tapped holes 12*c* in the axle plate 12. A vertical series of tapped holes 12*c* can be provided to allow the compression plates 16 to mount at various vertical positions, thus permitting the rear wheel to be positioned at different heights. A long slot 12*d* can be provided in the axle plate 12 to allow the camber tube 22 to be moved up or down within the axle plate 12 in order to position the camber tube 22 at a desired height. The tapped holes 12*c* permit discrete or finite increments of height adjustment. It should be appreciated by one of ordinary skill in the art that finite increments of height adjustment can be accomplished in some other manner, such as by providing serations on the compression plates 16 that mate with serations on the axle plate 12. It should also be appreciated by one of ordinary skill in the art that fasteners other than the cap screws 20 shown may be suitable for carrying out the invention.

The compression sleeve 18 is adapted to be sandwiched between the two compression plates 16. The compression sleeve 18 can be provided with two chamfered edges 18*a* that are adapted to mate with fillets 16*a* on an inner diameter of the compression plates 16. When the fasteners 20 are tightened, the compression plates 16 squeeze together against the compression sleeve 18, causing radial expansion, deformation, or displacement of the compression sleeve 18 to force the compression sleeve 18 to close around the camber tube 22, thus locking the camber tube 22 in a fixed position. A slit 18*b* in the compression sleeve 18 allows the compression sleeve 18 to flex as it compresses against the camber tube 22. When both left and right wheel mount assemblies 10 are tightened in this manner, the camber tube 22 cannot rotate or translate axially.

In order to adjust height of the rear wheel, a user can remove the fasteners from the axle plates 12 that are attached to both side frames of the wheelchair, slide the camber tube 22 up or down within the slot 12*d* to a new desired position, and then resecure the fasteners to the axle plates 12. To correct for any toe in or toe out, a user would loosen the fasteners and rotate the camber tube 22 until the tilt angle θ and camber tube axis A1 lie in a common vertical plane. Tightening the fasteners fixes the camber tube 22 in place.

The foregoing wheel mount assembly 10 is very compact, lightweight, and user friendly. These characteristics are achieved by virtue of the clamp assembly 14, which employs the compression sleeve 18 to fix the camber tube 22 in a desired position. The use of the compression plates 16 provides a lightweight and low profile appearance.

It should be clearly understood that the present invention is not intended to be limited in scope to the preferred embodiment of the invention described hereinabove. Several examples of alternative embodiments of the invention are described hereinbelow.

Figure 3:
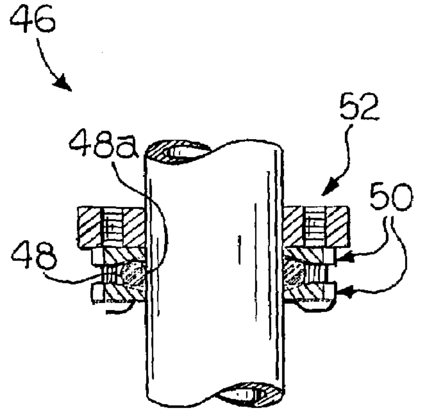
FIG. 3 is a cross-sectional view of the wheel mount assembly taken along the lines 3—3 in FIG. 2.
Figure 4:
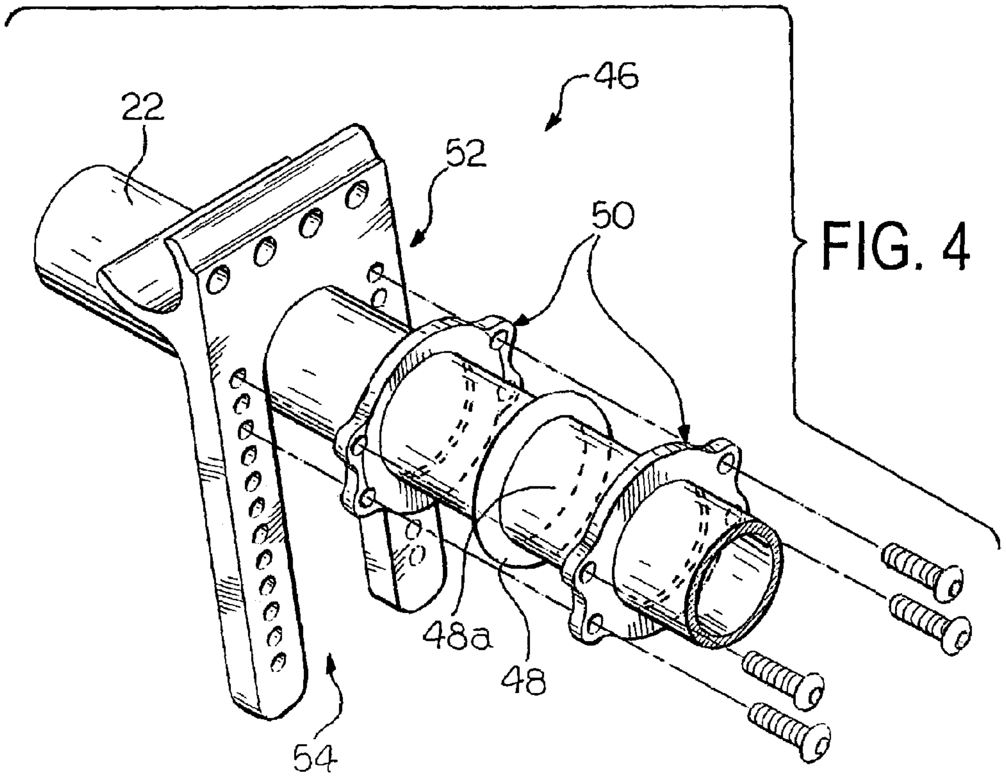
FIG. 4 is an exploded perspective view of the wheel mount assembly illustrated in FIGS. 2 and 3.

One alternated embodiment of a wheel mount assembly 46 is illustrated in FIGS. 3–4. This embodiment is similar to the preferred embodiment of the invention described above, except that the radially expandable, deformable, or displaceable member (i.e., the compression sleeve 18 described above) is replaced by a gasket or O-ring 48, which can be made of rubber or similar compressible material. When compression plates 50 are tightened against the O-ring 48, the O-ring 48 is displaced or deforms so as to radially expand, forcing the inner diameter 48*a* of the O-ring 48 against the outer diameter 22*a* of the camber tube 22, and locking the camber tube 22 in place. It should be noted that the axle plate 52 according to this embodiment of the invention is distinguished from that of the above-described embodiment in that this axle plate 52 is fork-shaped so as to have an open slot 54, as opposed to the closed slots 12*d* in the above-described embodiment. Like the first embodiment described above, it should be appreciated by one of ordinary skill that the present invention is not intended to be limited to the embodiment described with reference to FIGS. 2–4 and that other variations of this embodiment may be suitable for carrying out the invention. For example, the slot can be in the form of a series of scalloped holes (not shown)

Figure 7:
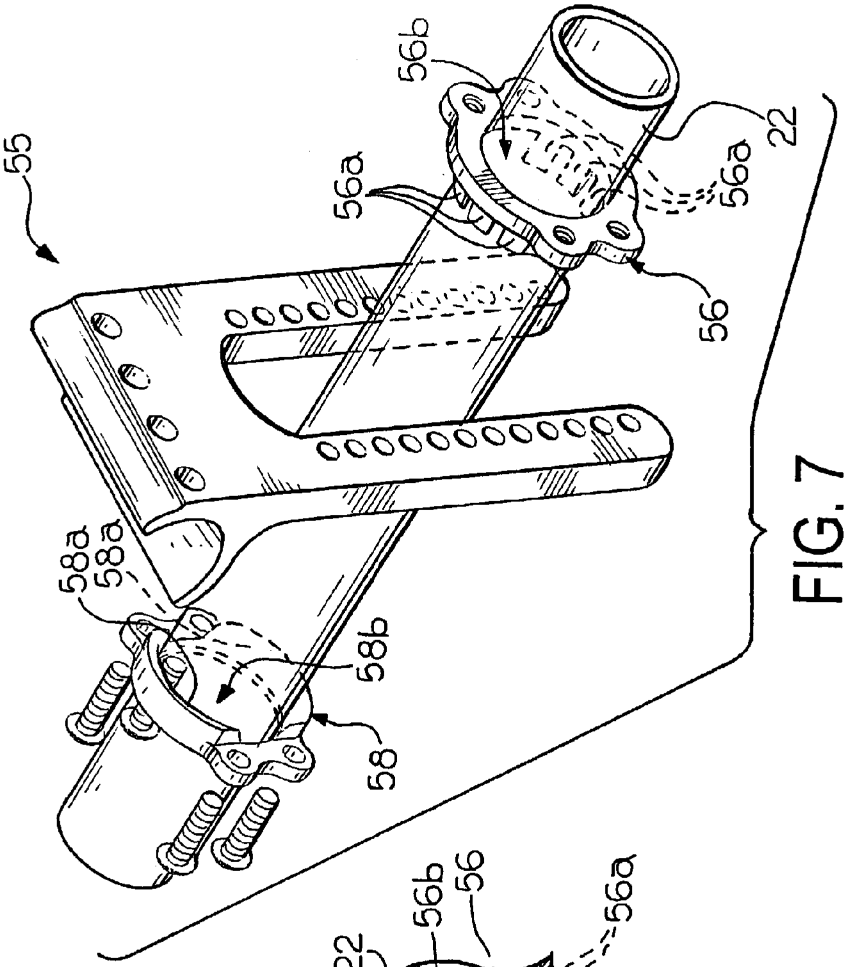
FIG. 7 is an exploded perspective view of the wheel mount assembly illustrated in FIGS. 5 and 6.
Figure 6:
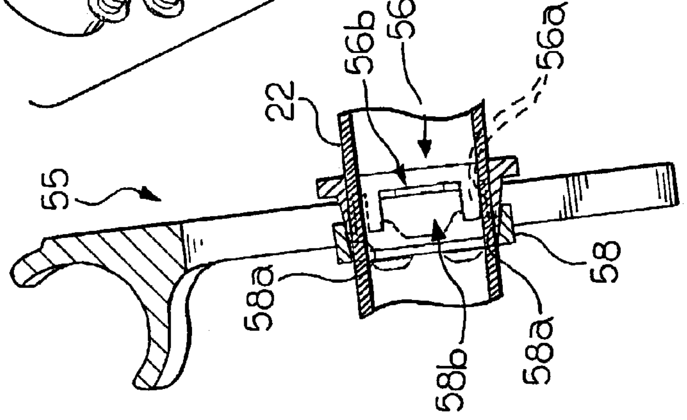
FIG. 6 is a cross-sectional view of the wheel mount assembly taken along the lines 6—6 in FIG. 5.
Figure 5:
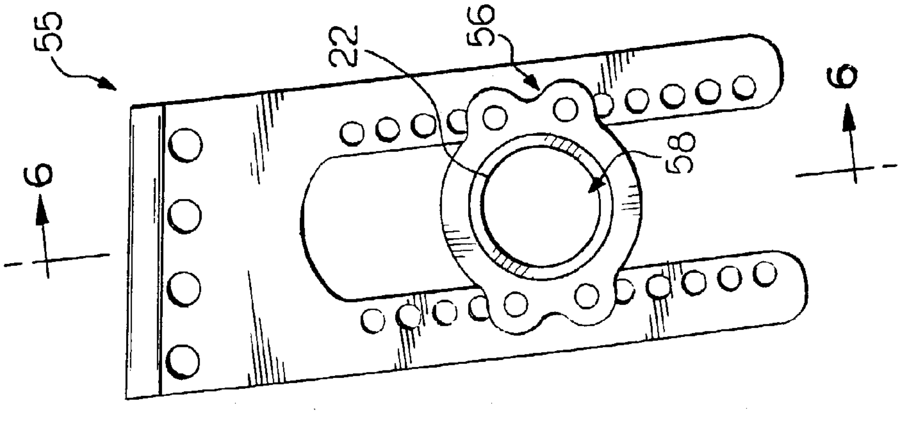
FIG. 5 is a side elevational view of an improved wheel mount assembly according to yet another embodiment of the invention.

Yet another embodiment of a wheel mount assembly 55 is illustrated in FIGS. 5–7. This embodiment is similar to the preferred embodiment of the invention described above, except that the radially expandable, deformable, or displaceable member (i.e., the compression sleeve 18) and the axially displaceable members (i.e., the compression plates 16) are replaced by a toothed locking sleeve 56 and locking collar 58, respectively. The toothed locking sleeve 56 has a series of ramped teeth 56*a* around a central bore 56*b* therethrough. These teeth 56*a* are adapted to engage fillets 58*a* around a central bore 58*b* in the locking collar 58. When the locking collar 58 is compressed against the toothed locking sleeve 56, the teeth 56*a* radially expand, deform, or displace to compress against the camber tube 22, locking the camber tube 22 in place.

Figure 9:
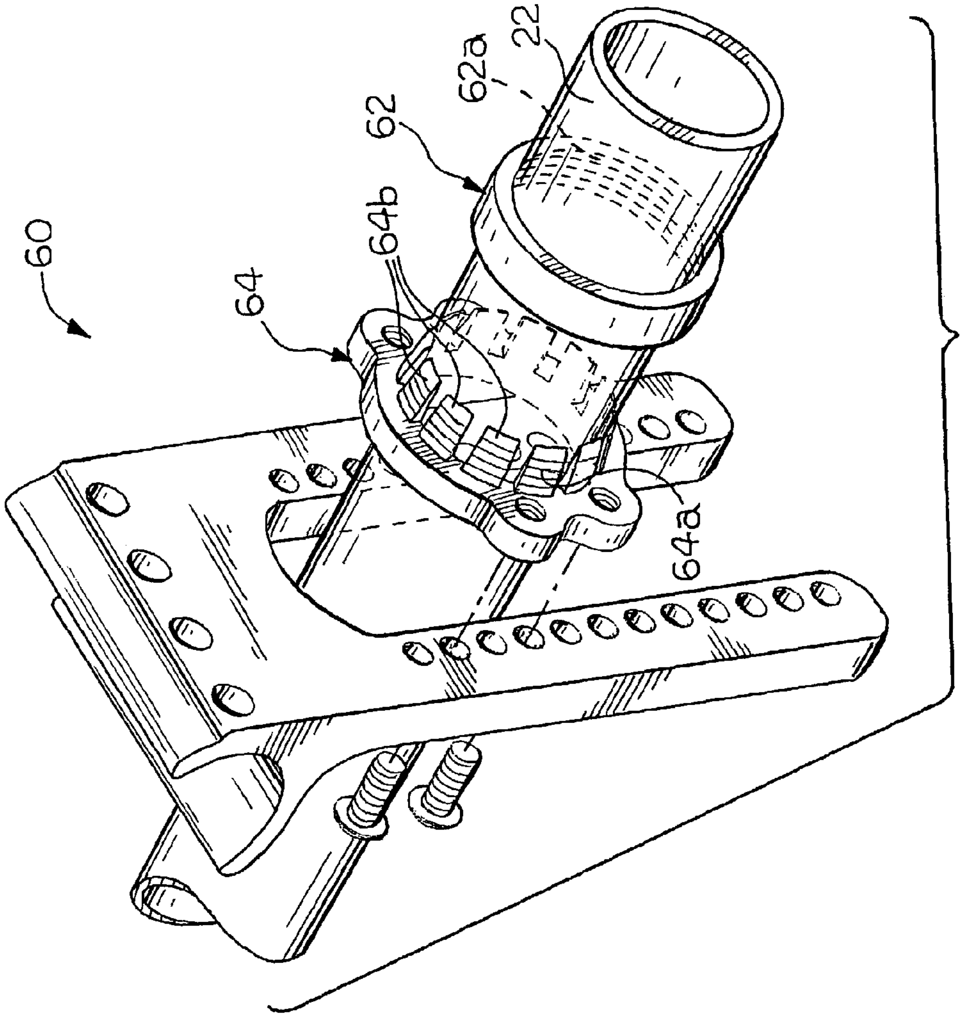
FIG. 9 is an exploded perspective view of the wheel mount assembly illustrated in FIG. 8.
Figure 8:
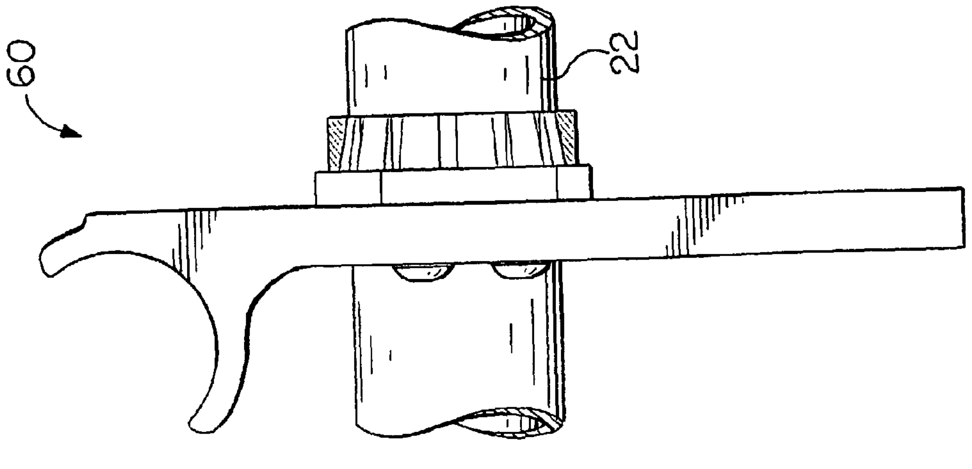
FIG. 8 is a front elevational view of an improved wheel mount assembly according to still another embodiment of the invention.

Still another embodiment of a wheel mount assembly 60 is illustrated in FIGS. 8 and 9. This embodiment is similar to the preferred embodiment, except that the axially displaceable members (i.e., the compression plates 16 described above) and the radially expandable, deformable, or displaceable member (i.e., the compression sleeve 18 described above), respectively, are replaced by a threaded collar 62 having internal threads 62*a* and a compression sleeve 64 with external threads 64*a*. Both the compression sleeve 64 and the threaded collar 62 are adapted to be disposed about a camber tube 22. The threads 64*a* on the compression sleeve 64 and the threads 62*a* on the threaded collar 62 are ramped so that, when the threaded collar 62 is tightened onto the compression sleeve 64, the compression sleeve 64 is radially displaced or forced against the camber tube 22, locking the camber tube 22 in place. The compression sleeve 64 may have a series of teeth 64*b* that are radially expandable, deformable, or displaceable to tighten against the camber tube 22, or may otherwise have a slit, that allows the compression sleeve 64 to compress against the camber tube 22 as the threaded collar 62 tightens about the compression sleeve 64.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheel mount assembly for use securing a camber tube to a wheelchair frame, the wheel mount assembly comprising:

an axle plate;

at least one axially displaceable member adapted to be fixed in relation to the axle plate; and at least one radially displaceable member adjacent the axially displaceable member, the axially displaceable member being adapted to be axially displaced to cause the radially displaceable member to be displaced to tighten against the camber tube to hold the camber tube in place.

2. The wheel mount assembly according to claim 1, wherein the axially displaceable member is a compression plate and the radially displaceable member is a ring shaped compression sleeve that is adapted to be compressed by the compression plate.

3. The wheel mount assembly according to claim 2, wherein the compression sleeve has a hole and the compression plate has a filleted bore, the camber tube being adapted to pass through the hole in the compression sleeve and through the filleted bore in the compression plate.

4. The wheel mount assembly according to claim 3, wherein the compression sleeve and compression plate are wedge shaped such that the compression sleeve compresses against the compression plate and locks the camber tube as the compression plate is displaced.

5. The wheel mount assembly according to claim 1, wherein the axially displaceable member is a compression plate each having a central bore and the radially displaceable member is a wedge shaped tooth, the central bore of the compression plate being filleted, the compression plate being adapted to be displaceable toward the wedge shaped tooth to clamp the wedge shaped tooth against filleted bore to hold the camber tube in place.

6. The wheel mount assembly according to claim 1, wherein the axially displaceable member is threaded collar with internal threads and the radially displaceable member is a compression sleeve with external threads, the threaded collar being adapted to tighten onto the compression sleeve to force the sleeve against the camber tube and hold the camber tube in place.

7. The wheel mount assembly according to claim 1, wherein the axially displaceable member is a compression plate and the radially displaceable member is an O-ring that is adapted to be compressed by the compression plate against the camber tube and hold the camber tube in place.

8. A wheel mount assembly for use in mounting a rear wheel to the frame of a wheelchair, the wheel mount assembly comprising:

an axle plate that is adapted to be attached to a wheelchair frame; and a clamp assembly adapted to be supported by the axle plate, the clamp assembly comprising:

at least one axially displaceable member; and at least one radially displaceable member adjacent the axially displaceable member, displacement of the axially displaceable member causes the radially displaceable member to tighten against the camber tube to hold the camber tube in place relative to the axle plate.

9. The assembly according to claim 8 wherein the axle plate has a mount for attaching the axle plate to a tubular wheelchair frame.

10. The assembly according to claim 9 wherein the mount is in the form of a saddle having a series of holes that are adapted to align with similarly spaced holes in the wheelchair frame to allow the axle plate to be mounted at various fore/aft positions on the wheelchair frame.

11. The assembly according to claim 8 further comprising a slot in the axle plate to allow the camber tube to be moved up or down within the axle plate in order to position the camber tube at a desired height.

12. The assembly according to claim 8 wherein the at least one axially displaceable member includes a pair of spaced compression plates and the at least one radially displaceable member includes a compression sleeve between the compression plates.

13. The assembly according to claim 12 wherein the compression plates are mounted to the axle plate using fasteners that are adapted to be threaded into mating tapped holes in the axle plate.

14. The assembly according to claim 13 wherein the mating tapped holes include a vertical series of tapped holes that allow the compression plates to mount at various vertical positions, thus permitting the rear wheel to be positioned at different heights.

15. The assembly according to claim 12 wherein the compression sleeve is provided with two chamfered edges that are adapted to mate with fillets on an inner diameter of the compression plates, which are adapted to squeeze the compression sleeve, causing radial deformation of the compression sleeve to force the compression sleeve to close around the camber tube, thus locking the camber tube in a fixed position.

16. The assembly according to claim 12 wherein a slit is provided in the compression sleeve to allow the compression sleeve to flex as it compresses against the camber tube.

17. The assembly according to claim 8 wherein the at least one axially displaceable member includes a pair of spaced compression plates and the at least one radially displaceable member is a gasket made of compressible material, the compression plates being adapted to squeeze the gasket to cause the gasket to expand radially, forcing an inner diameter of the gasket against an outer diameter of the camber tube, and locking the camber tube in place relative to the axle plate.

18. The assembly according to claim 8 wherein the at least one axially displaceable member includes a locking collar and the at least one radially displaceable member includes a toothed locking sleeve, the toothed locking sleeve having a series of ramped teeth around a central bore therethrough that are adapted to engage fillets around a central bore in the locking collar so that the teeth are radially displaced to compress against the camber tube, locking the camber tube in place relative to the axle plate.

19. The assembly according to claim 8 wherein the at least one axially displaceable member includes a threaded collar having internal threads and the at least one radially displaceable member includes a compression sleeve with external threads, the compression sleeve and the threaded collar being adapted to be disposed about a camber tube, threads on the compression sleeve and threads on the threaded collar being ramped so that, when the threaded collar is tightened onto the compression sleeve, the compression sleeve is radially displaced or forced against the camber tube, locking the camber tube in place.

20. An assembly comprising, in combination:

a pair of side frames including a left side frame and a right side frame; and a pair of wheel mount assemblies including a left wheel mount assembly attached to the left side frame and a right wheel mount assembly attached to the right side frame, the wheel mount assemblies supporting one or more camber tubes that are adapted to support left and right rear wheels, the wheel mount assemblies each comprising:

an axle plate that is adapted to be attached to a wheelchair frame; and a clamp assembly adapted to be supported by the axle plate, the clamp assembly comprising:

at least one axially displaceable member; and at least one radially displaceable member adjacent the axially displaceable member, displacement of the axially displaceable member causes the radially displaceable member to tighten against the camber tube to hold the camber tube in place relative to the axle plate.

* * * * *